United States Patent
Veprek et al.

(10) Patent No.: US 7,533,023 B2
(45) Date of Patent: May 12, 2009

(54) INTERMEDIARY SPEECH PROCESSOR IN NETWORK ENVIRONMENTS TRANSFORMING CUSTOMIZED SPEECH PARAMETERS

(75) Inventors: Peter Veprek, Santa Barbara, CA (US); Ted H. Applebaum, Santa Barbara, CA (US); Steven Pearson, Santa Barbara, CA (US); Roland Kuhn, Santa Barbara, CA (US)

(73) Assignee: Panasonic Corporation, Osaka (JP)

( * ) Notice: Subject to any disclaimer, the term of this patent is extended or adjusted under 35 U.S.C. 154(b) by 875 days.

(21) Appl. No.: 10/365,235

(22) Filed: Feb. 12, 2003

(65) Prior Publication Data

US 2004/0158457 A1    Aug. 12, 2004

(51) Int. Cl.
G10L 21/00 (2006.01)
G10L 15/00 (2006.01)
G10L 11/00 (2006.01)

(52) U.S. Cl. .............. 704/270.1; 704/270; 704/275; 704/200; 704/231

(58) Field of Classification Search ........ 717/178; 704/277, 275, 270.1, 270, 260, 258, 257, 704/256, 250, 247, 246, 244, 231, 226, 201, 704/200; 379/88.22

See application file for complete search history.

(56) References Cited

U.S. PATENT DOCUMENTS

| | | | |
|---|---|---|---|
| 5,673,362 A | 9/1997 | Matsumoto | |
| 5,899,973 A * | 5/1999 | Bandara et al. | 704/256.2 |
| 5,915,001 A * | 6/1999 | Uppaluru | 379/88.22 |
| 6,119,087 A | 9/2000 | Kuhn et al. | |
| 6,141,641 A * | 10/2000 | Hwang et al. | 704/243 |
| 6,327,346 B1 | 12/2001 | Infosino | |
| 6,339,594 B1 | 1/2002 | Civanlar et al. | |
| 6,385,586 B1 | 5/2002 | Dietz | |
| 6,389,114 B1 | 5/2002 | Dowens et al. | |
| 6,404,872 B1 | 6/2002 | Goldberg et al. | |
| 6,408,272 B1 * | 6/2002 | White et al. | 704/270.1 |
| 6,411,685 B1 | 6/2002 | O'Neal | |
| 6,412,011 B1 | 6/2002 | Agraharam et al. | |
| 6,456,975 B1 | 9/2002 | Chang | |
| 6,463,413 B1 | 10/2002 | Applebaum et al. | |
| 6,477,240 B1 | 11/2002 | Lim et al. | |
| 2001/0025240 A1 | 9/2001 | Bartosik | |

(Continued)

OTHER PUBLICATIONS

Rosenberg et al., "Speaker Verification Using Minimum Verification Error Training," Proc. 1998 Intl. Conf. on Acoustics, Speech and Signal Processing, vol. 1, pp. 109-112.*

(Continued)

Primary Examiner—Patrick N Edouard
Assistant Examiner—Paras Shah
(74) Attorney, Agent, or Firm—Harness, Dickey & Pierce, PLC (57) ABSTRACT

A speech processing system is provided for customizing speech parameters across speech applications in a networked environment. The speech processing system includes: a speech processing application residing on a first computing device, where the speech processing application is operable to capture customized speech parameters for a given user and communicate the customized speech parameters across a network; and an intermediary speech processor residing on a second computing device in the networked environment, where the intermediary speech processor adapted to receive the customized speech parameters and is operable to transform the customized speech parameters for use on a third computing device.

25 Claims, 5 Drawing Sheets

U.S. PATENT DOCUMENTS

| | | | |
|---|---|---|---|
| 2002/0065656 A1* | 5/2002 | Reding et al. | 704/244 |
| 2002/0094067 A1* | 7/2002 | August | 379/88.01 |
| 2002/0103639 A1* | 8/2002 | Chang et al. | 704/223 |
| 2002/0138274 A1* | 9/2002 | Sharma et al. | 704/270 |
| 2002/0184373 A1* | 12/2002 | Maes | 709/228 |
| 2003/0004720 A1* | 1/2003 | Garudadri et al. | 704/247 |
| 2003/0050783 A1* | 3/2003 | Yoshizawa | 704/270.1 |
| 2003/0105623 A1* | 6/2003 | Cyr et al. | 704/201 |
| 2003/0191636 A1* | 10/2003 | Zhou | 704/226 |
| 2004/0243414 A1* | 12/2004 | Yamada et al. | 704/270.1 |

OTHER PUBLICATIONS

Vaufreydaz et al., "From generic to task-oriented speech recognition: French experience in NESPOLE! European project," Aug. 2001, ITR-Workshopon Adaptation Methods For Speech Recognition, pp. 179-182.*

* cited by examiner

FIG. 5 ized speech parameters for a given user and communicate the customized speech parameters across a network; and an intermediary speech processor residing on a second computing device in the networked environment, where the intermediary speech processor adapted to receive the customized speech parameters and is operable to transform the customized speech parameters for use on a third computing device.

For a more complete understanding of the invention, its objects and advantages, reference may be had to the following specification and to the accompanying drawings.

INTERMEDIARY SPEECH PROCESSOR IN NETWORK ENVIRONMENTS TRANSFORMING CUSTOMIZED SPEECH PARAMETERS

FIELD OF THE INVENTION

The present invention relates generally to speech processing systems and, more particularly, to an intermediary speech processor for customizing speech parameters across different speech applications in a networked environment.

BACKGROUND OF THE INVENTION

Speech processing is increasingly being incorporated into a variety of consumer devices, including personal computers, cell phones, personal data assistants, etc. Speech processing is typically realized in one of two approaches: speech processing is performed on the consumer device or it is distributed between the consumer device and a server. The problem with these two approaches is that they address only the computational aspect of speech processing. Currently, there is a lack of an intermediary that would enable sharing of user models and other user-specific preferences. As a result, training sessions and other initialization procedures need to be repeatedly performed by users on their different devices. In other words, current speech processing architectures do not support sharing of users' customization data amongst speech applications residing on different consumer devices.

SUMMARY OF THE INVENTION

In accordance with the present invention, a speech processing system is provided for customizing speech parameters across speech applications in a networked environment. The speech processing system includes: a speech processing application residing on a first computing device, where the speech processing application is operable to capture customized speech parameters for a given user and communicate the customized speech parameters across a network; and an intermediary speech processor residing on a second computing device in the networked environment, where the intermediary speech processor adapted to receive the customized speech parameters and is operable to transform the customized speech parameters for use on a third computing device.

DETAILED DESCRIPTION OF THE PREFERRED EMBODIMENTS

Figure 1:
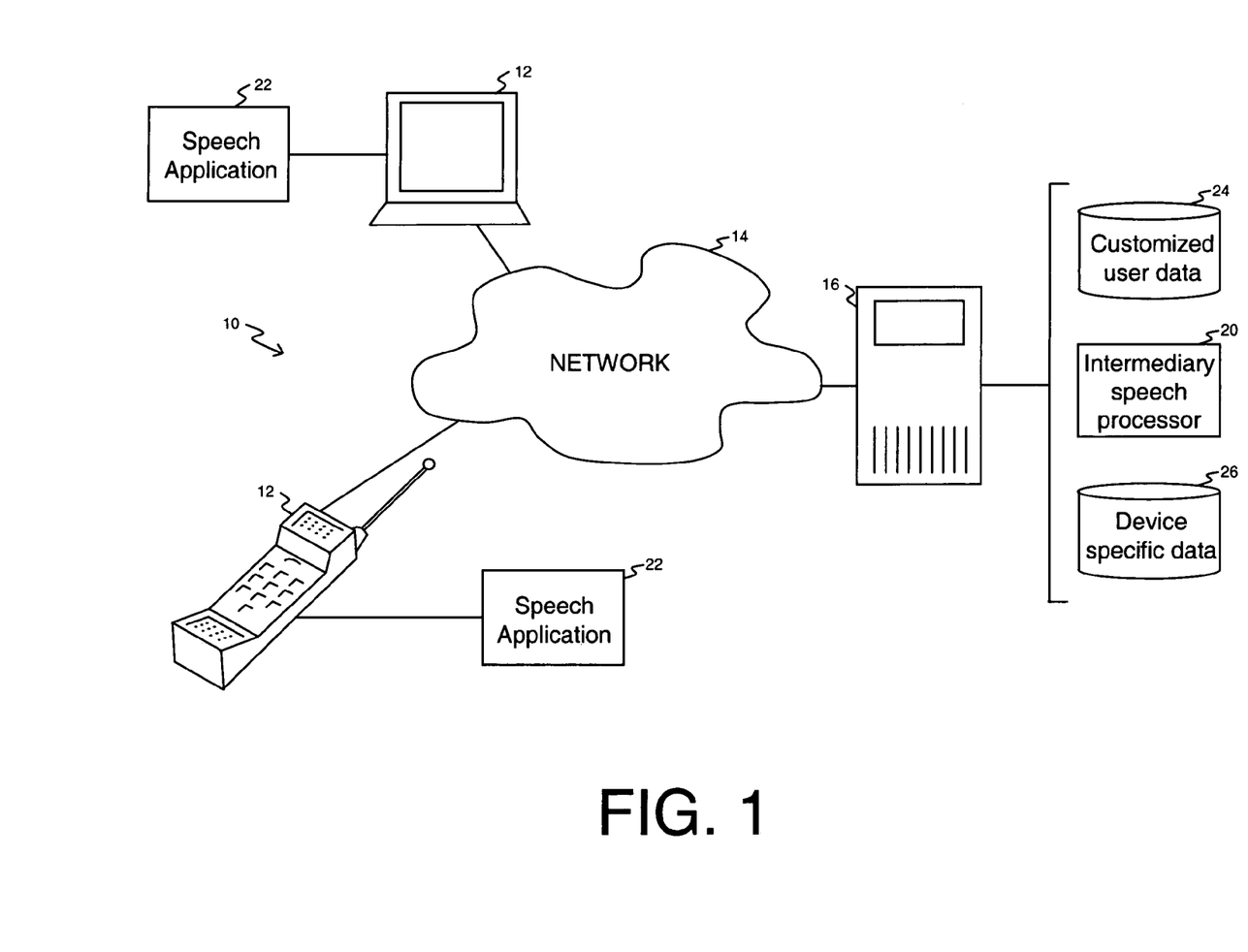
FIG. 1 is a diagram depicting an exemplary speech processing system for customizing speech parameters across speech applications in accordance with the present invention.

FIG. 1 illustrates an exemplary speech processing system 10 for customizing speech parameters across speech applications in a networked environment. The speech processing system 10 generally includes two or more consumer devices 12 interconnected by a network 14. For illustrations purposes, the consumer devices 12 are shown as a personal, computer and a cellular telephone. However, it is readily understood that other types of consumer devices, such as facsimile machines or personal data assistants, are also within the scope of the present invention.

A speech processing application 22 preferably resides on each of the consumer devices 12. Speech processing services may include (but are not limited to) automatic speech recognition, speech synthesis, speaker recognition, speech dialog management, speech detection, spectral equalization, and spectral normalization. In operation, the speech processing applications 22 may capture various customized speech parameters from an end user. For instance, exemplary customized speech parameters may be user adapted acoustic models employed by an automatic speech recognizer in a dictation application. However, it is readily understood that the other types of customized speech parameters are within the broader aspects of the present invention. In addition, it is further understood that appropriate speech parameters vary based on the type of speech processing service.

Once captured, it is generally not sufficient to share customized speech parameters amongst speech applications residing on different types of computing devices. Thus, the speech processing application 22 is further operable to communicate the customized speech parameters across the network environment to an intermediary speech processor 20 residing a server 16. The customized speech parameters are then stored in a data store 24 associated with the network environment. It is envisioned that the data store may reside on the same computing device as the intermediary speech processor or distributed across multiple data stores across the network environment. Likewise, it is further envisioned that the processing capabilities of the intermediary speech processor 20 may also be distributed across multiple computing devices in the network environment. In any case, the data store 24 is accessible to the intermediary speech processor 20.

In accordance with the present invention, the intermediary speech processor 20 is adapted to receive the customized speech parameters and operable to transform the customized speech parameters for use on a different computing device. Since different computing devices may have different operational characteristics, the intermediary speech processor 20 may have access to a device specific data store 26 which stores operational parameters for different types of computing devices. As will be further described below, the transformation process for the speech parameters is in part based on the operational parameters of the target computing device.

Transformed speech parameters are stored in a data store associated with the network environment. Again, it is envisioned that the data store may reside on the same computing device as the intermediary speech processor or distributed across multiple data stores across the network environment. In either case, the transformed speech parameters are accessible to the target computing device. Lastly, the target computing device is able to perform speech processing services using the transformed customized speech parameters.

Language models and acoustic models associated with an automatic speech recognizer for a dictation system are typically adapted to (or customized for) the system user. For illustration purposes, the customization techniques of the present invention may be applied to language models and/or acoustic models of an automatic speech recognizer as is further described below and shown in FIG. 2.

Figure 2:
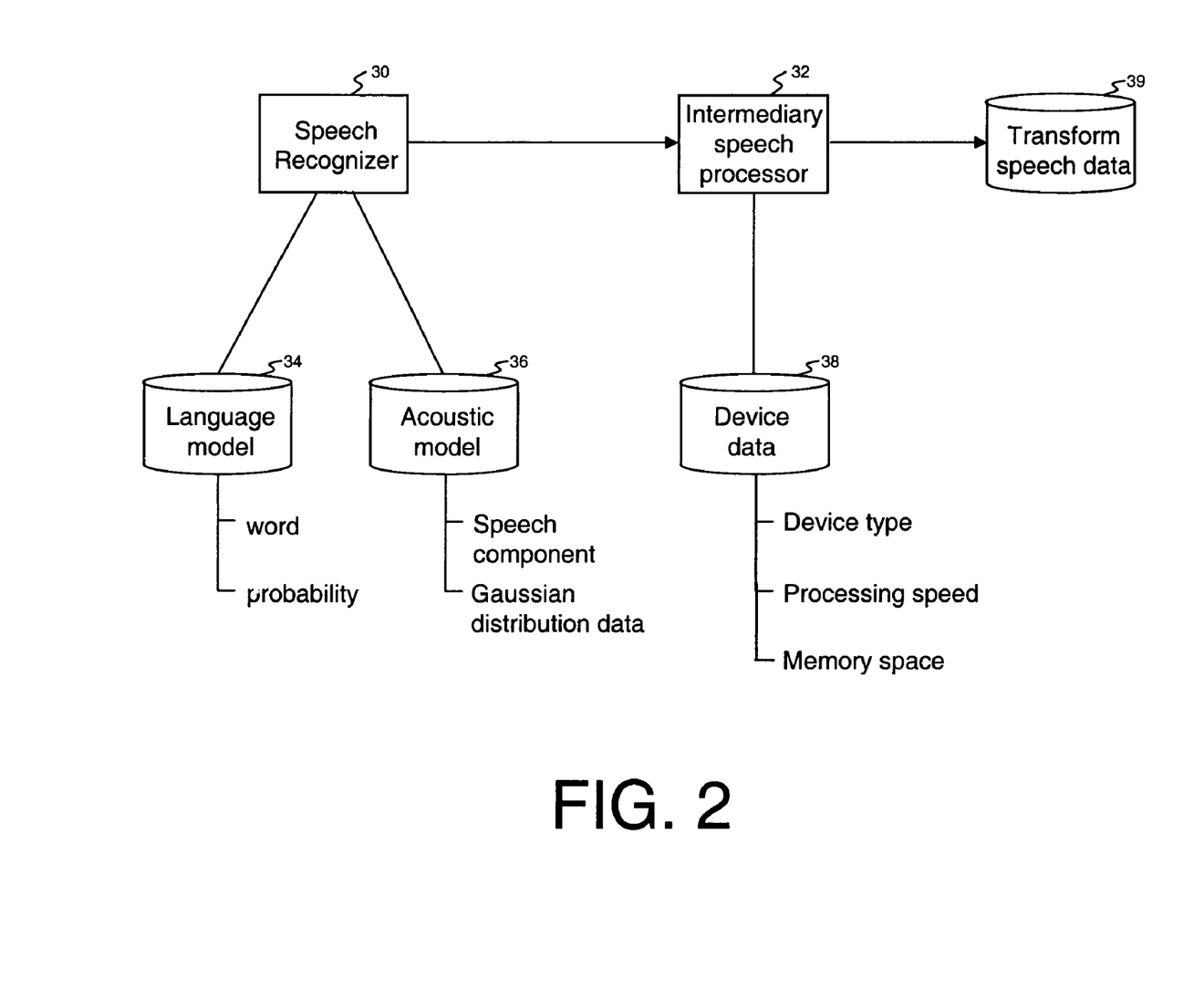
FIG. 2 is a diagram illustrating how the customization techniques of the present invention may be applied to automatic speech recognition.

Language models generally refer to a system's knowledge of what constitutes a possible word, what words are likely to co-occur, and in what sequence. In one exemplary embodiment, a language model 34 for a speech recognizer 30 may be formulated as a compilation of n-gram language models. For instance, a unigram model is defined by a word and its probability that it will be spoken by the speaker; whereas a bigram model is a given word, another word immediately preceding the given word, and the probability that these two words will be spoken in sequence. In a dictation system, the n-gram language models which comprise the language model may be adapted to a particular system user as is well known in the art.

For a large-vocabulary speech recognizer, the language model would typically include unigram models, bigram models and trigram models. Such speech recognizers are typically implemented on a personal computer or other similar computing devices which have the computing power and/or memory space needed to support the recognizer. However, it is envisioned that the system user may like to port their customized language model to other computing devices, such as a cell phone, which have less computing power and/or memory space than their personal computer. Thus, the large-vocabulary language model 34 may be transformed by the intermediary speech processor 32 in accordance with the operational characteristics of the target device which reside in a data store 38 accessible to the intermediary speech processor 32.

For instance, the intermediary speech processor 32 may reduce the size of the large-vocabulary language model based on the available memory space of a cell phone. Depending on the available memory space, the intermediary speech processor may delete all of the trigram models or delete the trigram models whose associated probability is below some predetermined threshold, thereby forming a portable language model having a reduced size. To further reduce the size of the language model, it is envisioned that all of the bigram models and trigram models may be deleted from the language model. It is readily understood that the transformation algorithm may be based on some other operational characteristics of the target device, such as computing power, available computing power, particular speech processing application, and/or some combination thereof. It is further understood that other types of transformation algorithms are within the broader aspects of the present invention. In any event, the transformed speech parameters are stored for subsequent processing in a data store 39 by the intermediary speech processor 32.

Similarly, acoustic models for an automatic speech recognizer in a dictation system may be transformed for use on a different computing device. In one exemplary embodiment, Hidden Markov Models may be employed as the acoustic models for the speech recognizer. Hidden Markov Models are typically used to model sub-word units, such as phonemes. In this case, the speech recognizer may employ one acoustic model for each phoneme. However, to further improve recognition accuracy, large-vocabulary speech recognizers typically employ context dependent acoustic models. For instance, such speech recognizers may include diphone models, triphone models, quadriphone models and other acoustic models which take into consideration neighboring phones. As discussed above, the intermediary speech processor may reduce the number of acoustic models based on the available memory space of the cell phone. It is envisioned that acoustic models defined at a word-level or some other speech sub-component are also within the scope of the present invention. In addition, it is further envisioned that other known adaptive techniques, such as maximum likelihood linear regression and maximum a posteriori adaptation, may also be used to modify the acoustic models employed by the speech recognizer.

Adaptive techniques are often employed to make acoustic models for speech recognition work better for the current user. For instance, when a user first begins to use a large-vocabulary speech recognition system for dictation, the system may often make word recognition errors because the acoustic models pre-loaded with the system do not reflect the user's voice characteristics. Once the user has been speaking to the system for some time, these adaptive techniques can exploit information contained in the user's stored speech to transform the original acoustic models so they more accurately reflect the current user's voice characteristics, resulting in a lower error rate. In the state of the art, the user must retrain the acoustic models to model his or her voice more accurately each time he or she begins to use a new speech device; this can be a time-consuming process. Thus, the present invention makes it possible for acoustic models that have been trained so they accurately model a given user's voice to be transferred to a new device. When the user begins talking to the new device, it already contains models that are customized to carry out word recognition with that user's voice.

Similarly, adaptive techniques may learn the characteristics of a given acoustic environment, thus making a speech recognition system work better in that environment. For instance, each type of car and even each type of room has its own acoustic characteristics, and a speech recognition system trained in that environment will perform better than one not trained in that environment. The present invention is also able to transfer knowledge about the characteristics of a given environment from one device to another. Thus, for instance, a user who has trained his PDA to work well in his sports car would be able to transfer that knowledge to a newly-purchased, voice-activated cell phone to be used in that car.

Figure 3:
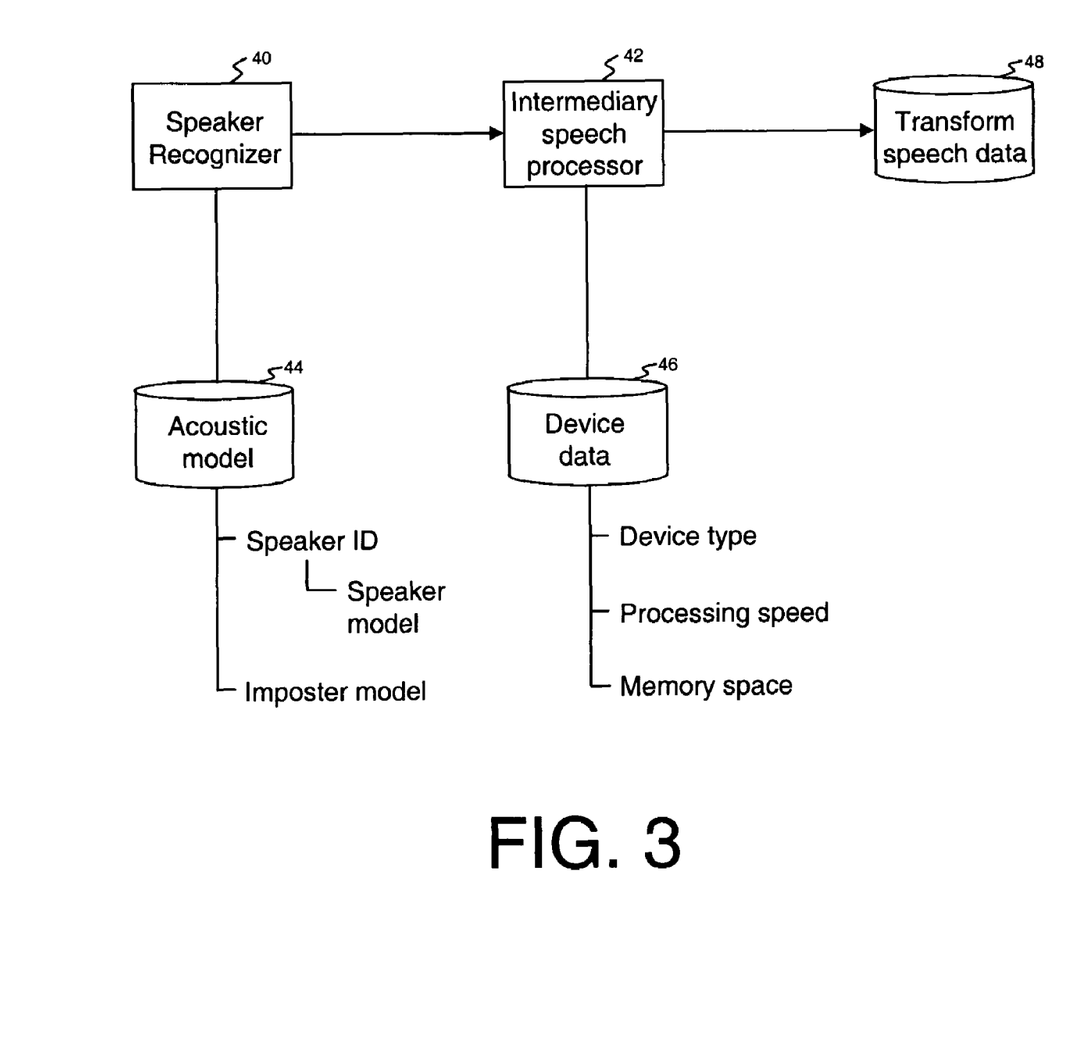
FIG. 3 is a diagram illustrating how the customization techniques of the present invention may be applied to speaker recognition.

Like speech recognition systems, systems for speaker recognition (i.e., speaker verification and speaker identification) contain acoustic models of speech. Referring to FIG. 3, an exemplary speaker recognition system includes a speaker recognizer 40 and a data store 44 for acoustics models. Each registered user of such a system is associated with a stored model of that person's voice, which may be embodied in a Gaussian Mixture Model (GMM), Hidden Markov Model (HMM), or other type of acoustic model. When the system is presented with new speech data, it compares the new speech with the stored models to determine if the new speech was produced by one of the registered users and if so, which one.

To register, each user must allow his or her voice to be recorded; the recorded data are used to train the model for that speaker. In general, the more speech has been recorded for a particular user, the more accurate the model for that user will be. Currently, a user must train his or her model independently for each device. The present invention enables a speaker model for speaker recognition trained on one device to be used on another.

In particular, the intermediary speech processor 42 is operable to transform the speaker models for use on another device. To do so, the intermediary speech processor 42 accesses device data residing in a data store 46. The transformed speaker models are then stored by the intermediary speech processor 42 in another data store 48 for subsequent processing. Thus, a user who has a well-trained speaker model on one device may be identified or verified by voice on a second device, without having to train a voice model on that second device, because the voice intermediary has stored a model of that user's voice. Note that the voice intermediary can use its knowledge of distortions typical of each of the two devices to calculate a transformation that will allow a model trained on the first device to be transformed and transferred to the second device in such a way as to minimize distortion.

Customization techniques of the present invention are also applicable to speech synthesis processing. For instance, a system user may select a preferred synthesized voice for a concatenative-based synthesizer residing on a personal computer and having a large number of built-in voices. In addition, the user may further customize the synthesized voice by adjusting the pitch contour, reading pauses, etc. In another instance, the user may have created a preferred synthesized voice based on their own voice. In either instance, the concatenative-based synthesizer relies on a large database of speech segments which may include (but is not limited to) diphones, triphones, and other types of sound units. Moreover, the database may include the same speech segment numerous times but in different contexts, with different pitches and/or with different durations.

In order to port the database to a target device having only limited resources, the intermediary speech processor may need to reduce the number of speech segments residing in the database. As described above, the intermediary speech processor may reduce the size of the database based on the available memory space of the target device. To do so, the intermediary speech processor may employ a transformation algorithm that deletes speech segments that occur multiple times in a similar phonetic context. Alternatively, the intermediary speech processor may eliminate triphones and/or quadriphones, but retain the diphones residing in the database. In yet another approach, the intermediary speech processor collapses those units that sound similar. For instance, a more comprehensive database may include speech segments with different version of the sound /t/. In this instance, the acoustically similar, but different speech segments can be grouped into one representative speech segment. As will be apparent to one skilled in the art, the transformation algorithm can be tailored to meet the space requirements of the target device. Once the target size is achieved, the transformed database may be accessible or transmitted to the target device.

The speech synthesizer may also rely on a prosodic database as is well known in the art. The prosodic database includes various prosodic attributes that are used by the speech synthesizer to improve synthesis. Exemplary prosodic attributes include (but are not limited to) amplitude, duration and intonation. The prosodic attributes may be stored separately for different speech segments appearing in different contexts, allowing for customization of the results based on the context or attributes encountered at the time of speech synthesis. Similarly, the prosodic attributes may be stored in a normalized form and then transformed to the appropriate final form based the data available at the time of synthesis. It is readily understood that the prosodic database may be organized in various manners, such as lists of prosodic templates, decision trees, sum-of-product models or neural networks. Thus, it is further envisioned that prosodic attributes residing on a first device may be transformed in a similar manner by the intermediary speech processor for use on a different device.

Alternatively, the target device may employ a parametric formant-based synthesizer. In this instance, the intermediary speech processor must derive representative formant parameters for the desired customized voice. In one exemplary approach, a speech synthesizer, 50 residing on the PC provides a sample utterance 52 of the customized voice to the intermediary speech processor 54 as shown in FIG. 3. The intermediary speech processor 54 will in turn perform speech analysis on the sample utterance. In particular, the intermediary speech processor 54 performs formant analysis on the waveform, thereby determining the formant frequencies and bandwidths for the customized voice. The identified formant parameters may then be sent by the intermediary to the target device for use by its formant-based synthesizer. Similarly, the intermediary speech processor may determine other parameters for the customized voice, such as average speech rate, average pitch, pitch range, etc. These additional speech parameters may also be provided to the target device for use by its formant-based synthesizer.

The intermediary speech processor may also be configured to formulate speech parameters based on speech processing data from a plurality of different users. A first speech processing application residing on a first computing device captures speech parameters customized for a first system user; whereas a second speech processing application residing on a second computing device captures speech parameters customized for a second system user.

Captured speech parameters are accessible to the intermediary speech processor which may reside on a third computing device in the networked environment. The intermediary speech processor is then operable to formulate enhanced speech parameters for use in the speech processing system. The enhanced speech parameters are stored, in a data store associated with the network environment, and thus accessible to a target computing device. Lastly, the target computing device is able to perform speech processing serves using the enhanced speech parameters.

An example relating to speech synthesis is further described below. A speech synthesizer typically includes a letter-to-sound module (i.e., phoneticizer) that converts spelled words into phonetic transcriptions which are in turn used during synthesis. However, many words have alternative pronunciations, such that the letter-to-sound module may produce multiple transcriptions for a given word. For instance, the words "Houston" may be pronounced as /H Y UW S T EN/ or as /H AW S T EN/. Since the first variant is more common, it may be designated as the default pronunciation for the synthesizer. It is understood that the speech synthesizer may receive input text containing abbreviations, mis-typing or other defects which are easily corrected by a human reader, but require more sophisticated processing for correction by the speech synthesizer. In this case, the speech synthesizer may further include a text normalization function which corrects these defects, for example converting "James St." to "James Street", or "St. James" to "Saint James". It is envisioned that this text normalization function may be performed by the intermediary speech processor.

A dialog manager associated with the synthesizer may monitor a users interaction with the synthesizer. User actions, such as repeated synthesis of some words and/or the use of a spelling mode, may serve as an indication of an incorrect pronunciation. In this case, the dialog manager could trigger the use of an alternative transcription. If the new transcription proves to be less problematic, it could be marked as the preferred transcription for use by the synthesizer.

In operation, the intermediary speech processor can collect data, such as preferred transcription data, from different devices in the network environment. Collected data may then be formulated into a baseline database of preferred transcriptions which may be downloaded by existing or new system users. Alternatively, it is envisioned that the intermediary speech processor may also be aware of the physical location of the various system users. Thus, the intermediary speech processor can be configured to deduce that users in a certain geographical area have repeated problems with a particular pronunciation. As a result, the intermediary speech processor may be operable to notify the devices for the identified area to use an alternative pronunciation. To the extent that the alternative pronunciation is not available on the target device, the intermediary speech processor may also download the alternative pronunciation to the target device.

Another type of data that can be collected from different devices in the network is users' reactions to different synthesized voices. By collating and analyzing feedback from many different users, it may be determined that certain voices are very popular, certain voices very unpopular, or that the popularity of certain voices depends on demographic factors (e.g., a certain voice might be popular with young women living in Texas but unpopular elsewhere). This information would be helpful, for instance, in deciding which synthesized voices to allow new customers to listen to first when they are choosing voices for speech synthesis applications.

Data pooling across different system users also yields benefits for speech recognition. For example, acoustic models incorporated in speech recognition systems typically benefit from being trained on a large quantity of speech collected from a variety of users. The collection of speech data from many different users and devices across the network will provide data on which the acoustic models for new users may be trained. Optionally, knowledge about the demographic origins of the data collected may be used to train specialized acoustic models for sub-groups of new users—for instance, the initial acoustic model for the speech recognizer of a new male customer from Georgia might be trained mainly on speech collected from males living in Georgia.

In another example, when a new speech input device, such as a microphone or cellphone handset, is introduced in the market, data is collected by the intermediary speech processor from end users who first use the speech input device. Collected data may be used to estimate the mathematical transformation needed to compensate for acoustic distortion associated with the speech input device. The intermediary speech processor can subsequently share the collected data with other end users who use the speech input device. It is readily understood that data pooling is also applicable to other types of speech processing services.

Speaker recognition offers another example of how an intermediary speech processor may provide enhanced speech processing services based on pooling data from different users. In speaker recognition, there are verification models (i.e., voiceprints) for each user's voice. In addition, the speaker recognition system may also employ imposter models which are intended to represent the remainder of the population. In this example, the intermediary speech processor may collect speech data for different end users and/or different devices in the networked environment. Data collected from users not enrolled in the speaker recognition system is then used to update the imposter models. It is envisioned that different imposter models may be formulated based on geographical location of the end user to compensate for local dialect or accents.

Figure 4:
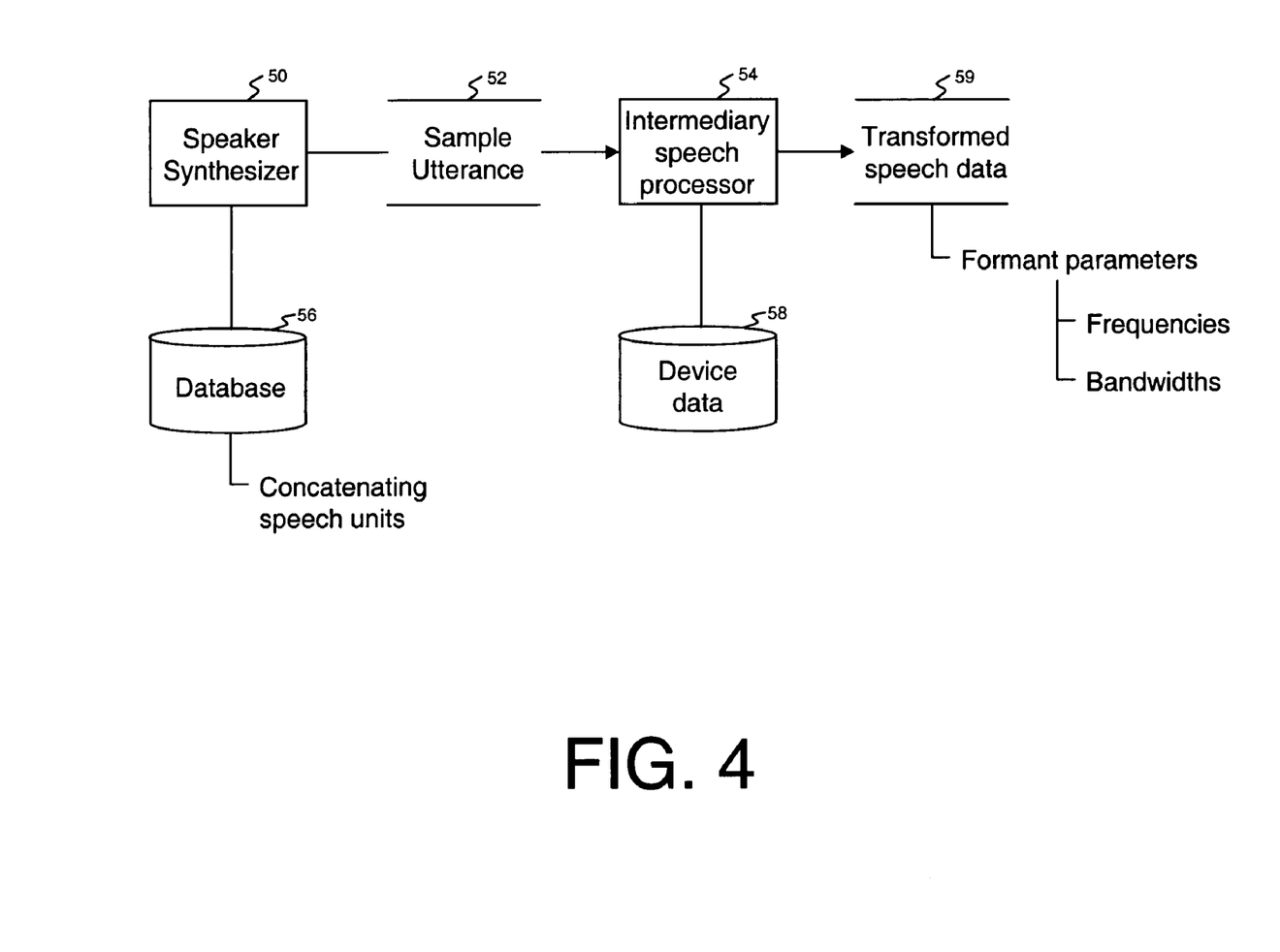
FIG. 4 is a diagram illustrating how the customization techniques of the present invention may be applied to speech synthesis.
Figure 5:
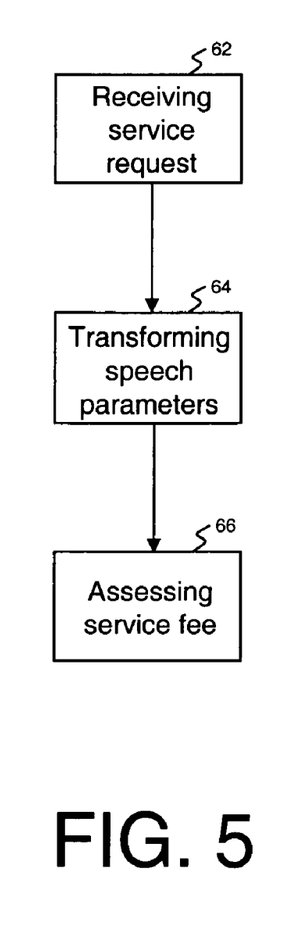
FIG. 5 is a flowchart illustrating a method for providing enhanced speech processing service in a speech processing system of the present invention.

In another aspect of the present invention, the intermediary speech processor enables different business models for providing enhanced speech processing service in a speech processing system. FIG. 4 illustrates an exemplary methodology for providing enhanced speech processing services at a fee to the end users. First, an end user initiates the process by requesting particular services offered by the service provider as shown at 42. In one embodiment, the end user transmits a request from one of its computing devices over the network to the intermediary speech processor. For instance, the end user may request that customized speech parameters residing on their personal computer be ported to their cell phone. It is readily understood that the request may be formulated and communicated to the service provider in a variety of different forms.

Next, the service provider provides the enhanced speech processing services to the end user as shown at 44. In the exemplary embodiment, the customized speech parameters are transformed for use on the cell phone by the intermediary speech processor. In another embodiment, the enhanced speech processing service may be speaker recognition of the end user. That is, after the end user has spoken some words, the speech intermediary may recognize him or her and inform a third party of the user's identity, based on the voice characteristics of the spoken words and a stored model of the end user's voice. For instance, someone claiming to be me may call up a bank and demand confidential information about my finances. In this instance, the speech intermediary may be invoked to compare the voice characteristics of the caller with my stored voice model and inform the bank of whether or not the caller is likely to be me. In the preferred embodiment, this authentication step would involve other confirming information (e.g., a PIN number) in addition to the speaker recognition step.

Lastly, the end user is assessed a fee at 46 for the enhanced speech processing services. It is envisioned that each service may be provided for a fixed fee or, alternatively, the service fee may be based on the type or amount of services provided by the intermediary speech processor.

Alternatively, a third party may be assessed a fee for speech processing services provided to the end user. For example, a bank may provide a service which uses speech synthesis to announce an end user account balance. To improve the quality of the synthesized speech, the bank may wish to send an intonation pattern along with the text of the message to the synthesizer residing on the user's device. The intonation pattern is then used by the synthesizer to improve the quality of the synthesized speech. In this example, the intermediary speech processor acts to customize the intonation pattern for the end user's device. In addition, the bank, not the end user, may be assessed a service fee for providing the enhanced speech processing services. In another example, the intermediary speech processor may distribute language models on behalf of the bank to one or more end users.

Similarly, the intermediary speech processor may customize the voice provided to a given customer to its knowledge of that customer's preferences. Thus, the same text provided by the bank may be read to one customer in a soothing female voice, while being read to another customer in a businesslike, rather gruff male voice. The intermediary speech processor may also provide the bank with acoustic models customized for a given user, thus ensuring that when that user accesses speech-activated services provided by the bank, the number of word recognition errors for that user will be minimized. In similar fashion, the speech intermediary may use the voice model stored for a given user to inform the bank that a person currently talking to the bank (e.g., over the telephone) mostly probably is or most probably is not who he or she claims to be. It will be seen that the speech intermediary has much valuable speech-related information pertaining to particular devices and particular users, not easily available to a third party (such as the bank in the example) that the third party would often be willing to pay for. It is readily understood that other types of business models enabled by the intermediary speech processor are within the scope of the present invention.

While the invention has been described in its presently preferred form, it will be understood that the invention is capable of modification without departing from the spirit of the invention as set forth in the appended claims.

What is claimed is:

1. A speech processing system customizing speech parameters across a networked environment, comprising: a speech processing application residing on a first computing device, the speech processing application capturing and processing speech of a given user and further capturing customized speech parameters for the given user and communicate the customized speech parameters across a network, wherein the customized speech parameters are further defined as acoustic models unique to the given user; an intermediary speech processor residing on a second computing device in the networked environment, the second computing device being interconnected by the network to the first computing device; said intermediary speech processor receiving the customized speech parameters and transforming the customized speech parameters for use on a third computing device based on hardware characteristics of the third computing device; and a speech processing application residing on the third computing device, the speech processing application residing on the third computing device capturing speech and processing speech, the intermediary speech processor transmitting the transformed customized speech parameters to the speech processing application residing on the third computing device, wherein the speech processing application residing on the third computing device uses the transformed customized speech parameters to process speech.

2. The speech processing system of claim 1 further comprises a speech processing application residing on the third computing device, the speech processing application accessing the transformed customized speech parameters and performing speech processing using the transformed customized speech parameters.

3. The speech processing system of claim 1 wherein the intermediary speech processor is further operable to store the transformed customized speech parameters in a data structure associated with the network environment.

4. The speech processing system of claim 3 wherein the data structure resides in a data store on the first computing device.

5. The speech processing system of claim 3 wherein the data structure resides in a data store on the second computing device.

6. The speech processing system of claim 3 wherein the data structure resides in a data store on the third computing device.

7. The speech processing system of claim 3 wherein the data structure resides in two or more data stores distributed across the networked environment.

8. A speech processing system customizing speech parameters across a networked environment, comprising: at least one of a first speech recognizer and a first speaker recognizer residing on a first computing device, the at least one first speech recognizer and first speaker recognizer capturing customized speech parameters for a given speaker and communicate the customized speech parameters across a network; and an intermediary speech processor residing on a second computing device, the second computing device being interconnected by the network to the first computing device; said intermediary speech processor receiving customized speech parameters, said intermediary speech processor retrieving one or more device parameters for a third computing device from a device parameter data store and transform the customized speech parameters for use on the third computing device based on the one or more device parameters for the third computing device, the device parameters selected from either available memory space on the third computing device or the available processing resources of the third computing device.

9. The speech processing system of claim 1 further comprises at least one of a second speech recognizer and a second speaker recognizer residing on the third computing device, the at least one second speech recognizer and the second speaker recognizer being accessing the transformed customized speech parameters and performing speech processing using the transformed customized speech parameters.

10. The speech processing system of claim 8 further comprises at least one of a second speech recognizer and a second speaker recognizer residing on the third computing device, the intermediary speech processor transmitting the transformed customized speech parameters to the at least one second speech recognizer and second speaker recognizer residing on the third computing device.

11. The speech processing system of claim 8 wherein the intermediary speech processor is further storing the transformed customized speech parameters in a data structure associated with the network environment.

12. The speech processing system of claim 11 wherein the data structure resides in a data store on the first computing device.

13. The speech processing system of claim 11 wherein the data structure resides in a data store on the second computing device.

14. The speech processing system of claim 11 wherein the data structure resides in a data store on the third computing device.

15. The speech processing system of claim 11 wherein the data structure resides in two or more data stores distributed across the networked environment.

16. The speech processing system of claim 8 wherein the intermediary speech processor transforms the customized speech parameters based on available memory space residing on the third computing device.

17. The speech processing system of claim 8 wherein the intermediary speech processor transforms the customized speech parameters based on available processor resources of the third computing device.

18. The speech processing system of claim 8 wherein the intermediary speech processor transforms the customized speech parameters based on the type of speech application residing on the third computing device.

19. The speech processing system of claim 8 wherein the customized speech parameters are further defined as speech recognition models.

20. The speech processing system of claim 8 wherein the customized speech parameters are further defined as a language model having a plurality of parameters, such that the intermediary speech processor modifies the parameters residing in the language model based on an operational characteristic of the third computing device.

21. The speech processing system of claim 8 wherein the customized speech parameters are further defined as a plurality of acoustic models employed by the first speech recognizer, such that the intermediary speech processor modifies the plurality of acoustic models based on an operational characteristic of the third computing device.

22. The speech processing system of claim 8 wherein the first speech recognizer adapting the plurality of acoustic models for the given speaker and the intermediary speech processor transforms the adapted acoustic models for use on the third computing device.

23. The speech processing system of claim 8 wherein the customized speech parameters are further defined as acoustic channel characteristics associated with capturing speech on the first computing device.

24. The speech processing system of claim 8 wherein the customized speech parameters are further defined as environment characteristics associated with capturing speech on the first computing device.

25. The speech processing system of claim 8 wherein the customized speech parameters are further defined as speaker recognition models.

* * * * *